United States Patent [19]
Gläser et al.

[11] Patent Number: 5,505,814
[45] Date of Patent: Apr. 9, 1996

[54] WELDING DEVICE FOR WELDING A WELDING PROFILE TO A WELDING GROOVE

[75] Inventors: Eberhard Gläser, Aichwald; Reiner Möck, Pfullingen; Fridolin Wohlfarth, Bartholomä; Heidrun Franz, Stuttgart, all of Germany

[73] Assignee: Ed. Zublin Aktiengesellschaft, Stuttgart, Germany

[21] Appl. No.: 282,786

[22] Filed: Jul. 29, 1994

[30] Foreign Application Priority Data

Jul. 31, 1993 [DE] Germany ............... 43 25 749.6

[51] Int. Cl.⁶ .................................. B65H 81/00
[52] U.S. Cl. ............ 156/391; 156/293; 156/497; 156/322; 156/309.9; 156/576
[58] Field of Search .................... 156/391, 293, 156/287, 497, 322, 309.9, 576

[56] References Cited

U.S. PATENT DOCUMENTS

| | | |
|---|---|---|
| 2,516,242 | 7/1950 | Munger . |
| 3,077,171 | 2/1963 | Gotsch et al. ............... 118/317 |
| 3,126,306 | 3/1964 | Sherman ............... 156/244.13 X |
| 4,415,390 | 11/1983 | Smith ............... 156/392 X |
| 4,685,989 | 8/1987 | Matsuno et al. ............ 156/244.13 |
| 4,698,368 | 10/1987 | Moody ............... 156/391 X |
| 4,725,328 | 2/1988 | Arnold ............... 156/309.9 X |
| 4,758,302 | 7/1988 | Hannover ............... 156/391 |
| 4,959,110 | 9/1990 | Russell ............... 156/195 X |
| 5,296,078 | 3/1994 | Frey ............... 156/466 |

FOREIGN PATENT DOCUMENTS

| | | | |
|---|---|---|---|
| 1039836 | 8/1966 | Australia ............... 156/287 |
| 745591 | 8/1970 | Belgium ............... 156/497 |
| 747239 | 9/1970 | Belgium ............... 156/497 |
| 3637298 | 5/1988 | Germany . | |
| 102312 | 6/1982 | Japan ............... 156/391 |
| 1073113 | 2/1984 | U.S.S.R. ............... 156/576 |

*Primary Examiner*—David A. Simmons
*Assistant Examiner*—Steven J. Helmer
*Attorney, Agent, or Firm*—Robert W. Becker & Associates

[57] ABSTRACT

A welding device for welding a welding profile to an inner welding groove of a locking device, consisting of a first hollow profiled member inserted into a second hollow profile member, has a carriage with a housing whereby the carriage has a longitudinal axis and is movable in the longitudinal direction. A heating device is connected inside the housing. A pressing device for pressing the welding profile into the welding groove is connected inside the housing. The pressing device has a pressure-applying member. A clamping device for securing a lower flattened side of the welding profile is connected inside the housing. In the direction of supplying the welding profile the clamping device is arranged downstream of the heating device and the pressing device. The welding profile is guided from the heating device via the pressure-applying member to the clamping device.

23 Claims, 3 Drawing Sheets

5,505,814

WELDING DEVICE FOR WELDING A WELDING PROFILE TO A WELDING GROOVE

BACKGROUND OF THE INVENTION

The present invention relates to a welding or fusing device for welding (fusing) a welding profile (rope) to an inner welding groove of a locking device comprised of hollow profiled members inserted into one another.

From German Patent 36 37 298 a locking device comprised of hollow profiled members inserted into one another is known which locking device serves to connect wall sections of a multi-sectioned wall to be used as a liquid barrier. In order to achieve a liquid-tight closure of the gap between the inner and outer profiled members, in a first step an inner groove is cut with a cutting device over the length of the locking device which inner groove extends through the wall of the inner profiled member into the wall of the outer profiled member. This inner welding groove is then preheated and is filled with a fusing or welding profile (rope) that is heated to the welding temperature. It has been demonstrated that the required uniform heating of the welding profile and the inner welding groove needed for a liquid-tight welding (fusing) is difficult to achieve. Especially, the reliable application of the welding profile at the lower end of the welding groove is problematic.

It is therefore an object of the present invention to provide a welding device of the aforementioned kind such that in a simple manner a reliable application of the welding profile into the welding groove as well as a reliable welding of the welding profile to the welding groove is ensured.

SUMMARY OF THE INVENTION

A welding device for welding a welding profile to an inner welding groove of a locking device comprised of a first hollow profiled member inserted into a second hollow profiled member according to the present invention is primarily characterized by:

A carriage with a housing, the carriage having a longitudinal axis and being movable in the longitudinal direction;

A heating device connected inside the housing;

A pressing device, for pressing the welding profile into the welding groove, connected inside the housing, the pressing device comprising a pressure-applying member;

A clamping device, for securing a lower flattened end of the welding profile, connected inside the housing, wherein in a direction of supplying the welding profile the clamping device is arranged downstream of the heating device and the pressing device; and Wherein the welding profile is guided from the heating device via the pressure-applying member to the clamping device.

Preferably, the clamping device and the pressing device are coupled with one another such that upon applying the pressing device the clamping device is released.

Preferably, the heating device is a source of hot air having a hot air channel that opens into the welding groove.

Advantageously, the hot air channel is funnel-shaped and widens in the direction of hot air flow toward the welding groove.

Expediently, the hot air channel has a wall section for guiding the welding profile toward the pressure-applying member.

Advantageously, the welding profile is guided obliquely to an inflow direction of hot air into the hot air channel.

In a preferred embodiment of the present invention, the housing comprises an insulating insert and the hot air channel is positioned within the insulating insert.

Preferably, the insulating insert has a guide channel for the welding profile, the guide channel opening into the hot air channel.

The inlet section of the guide channel is preferably delimited by the insulating insert and a wall of the housing.

In another embodiment of the present invention, the housing has a window and the hot air channel as well as the pressure-applying member are positioned inside the housing behind the window. Preferably, the clamping device is also positioned behind the window.

In yet another embodiment of the present invention, the welding device further comprises a counter pressure member positioned diametrically opposite the pressure-applying member relative to the longitudinal axis, and a housing opening through which the counter pressure member can be moved in and out of contact with the pressure-applying member.

Preferably, the welding device further comprises a linkage connected to the pressure-applying member and the counter pressure member for displacing together the pressure-applying member and the counter pressure member.

Advantageously, the welding device further comprises a pressure cylinder for actuating the linkage.

Expediently, the force applied by the pressure cylinder onto the pressure-applying member is adjustable.

In a preferred embodiment of the present invention, the welding device further comprises a spring-biased spreading device connected between the pressure-applying member and the counter pressure member.

Advantageously, the force applied by the spreading device onto the pressure-applying member is adjustable.

In a further embodiment of the present invention, the counter pressure member is a roller.

Preferably, the welding device further comprises a pressure cylinder connected to the pressure applying member for displacing the pressure-applying member.

Advantageously, the welding device further comprises a slide, preferably a wedge-shaped slide, connected between the pressure-applying member and the pressure cylinder, wherein the pressure cylinder acts on the slide to displace the pressure-applying member transverse to the longitudinal axis. Advantageously, the force applied by the pressure cylinder onto the pressure-applying member is adjustable.

Expediently, the pressure-applying member is a roller.

According to the present invention, the lower, preferably flattened end of the welding profile (rope) is secured in a clamping device which is, when viewed in the feeding direction of the welding profile, arranged downstream of the heating device and the pressing device. The welding profile is guided from the heating device via the pressure-applying member of the pressing device to the clamping device. With this arrangement a secure fixation of the welding profile on the pressure-applying member is ensured so that upon reaching the starting point of the welding groove an exact and reliable insertion of the lower end of the welding profile into the welding groove is ensured.

Preferably, the clamping device and the pressing device are coupled with one another such that upon applying the pressing device the clamping device is released so that upon pressing the free end of the welding profile into the welding groove the clamping device releases the lower end of the welding profile. The welding device is then moved along the welding groove with a respective advancing speed, and the plasticized welding profile is forced into the welding groove so as to be welded therein.

According to a further embodiment of the invention, the heating device in the form of a source of hot air provides hot air to a channel that opens into the welding groove and which preferably widens in a funnel-shaped manner toward the welding groove. The welding profile is guided along the wall of the hot air channel toward the pressure-applying member whereby the welding profile extends transverse to the flow direction of the hot air entering the hot air channel. This guiding of the welding profile ensures that a sufficient heating to the required welding (fusing) temperature is achieved whereby the hot air passing along the welding profile exits at the welding groove and heats uniformly the walls of the welding groove to the required welding temperature.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
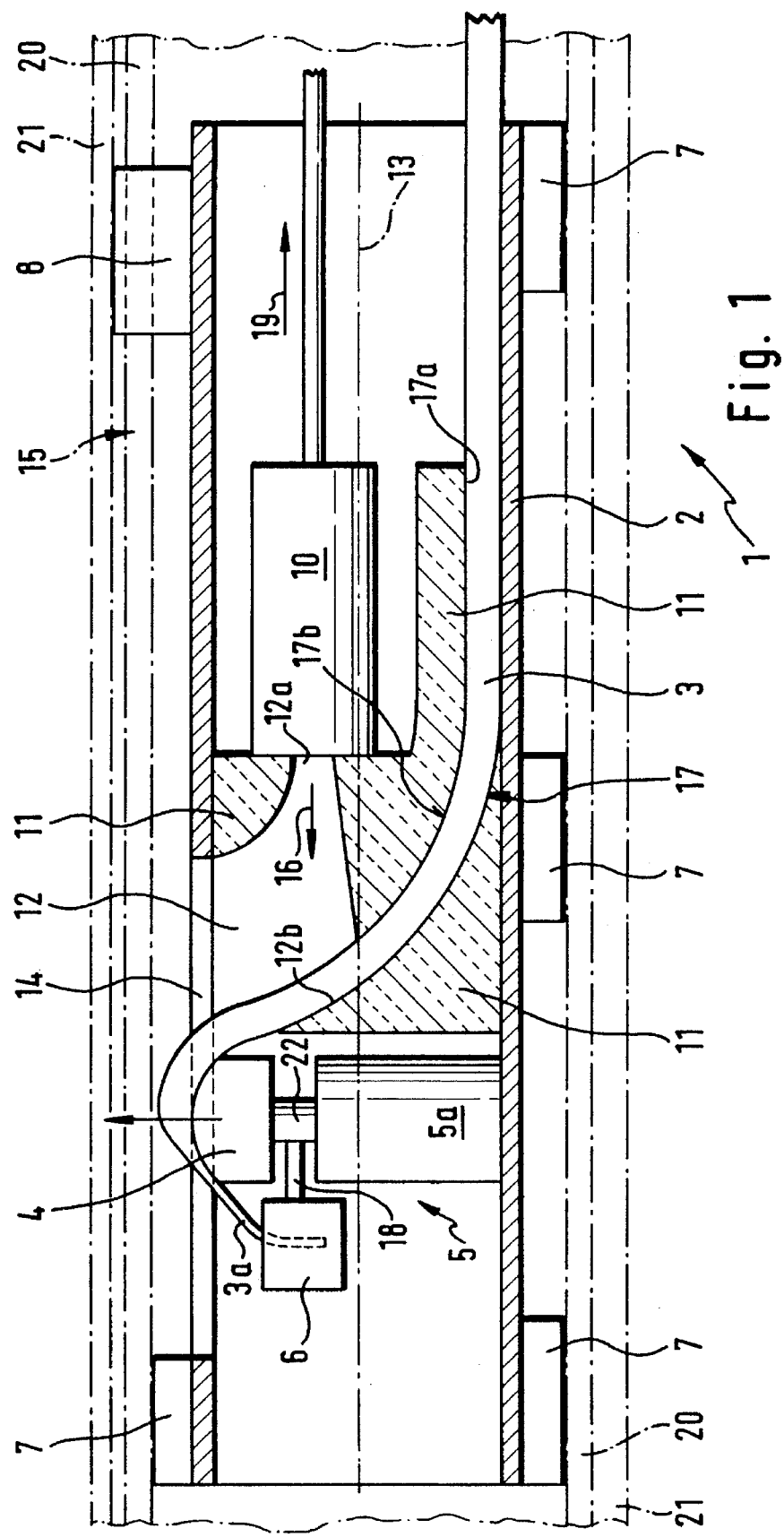
FIG. 1 is a sectional view of the inventive welding device.

The present invention will now be described in detail with the aid of several specific embodiments utilizing FIGS. 1 through 4.

The welding devices represented in the drawings are essentially identical with respect to their basic construction. The welding device of all of the shown embodiments is comprised of a tube open at both ends which forms the housing 2 for the carriage 1 of the welding device. At the center of the cylindrical housing 2 a housing insert 11 is provided which extends over the entire cross-section of the tube. The housing insert 11 is comprised of a thermally insulating material. Within the housing insert 11 a hot air channel 12 is provided which begins at one of the end faces of the housing insert 11 and opens transverse to the longitudinal housing axis 13 in a window 14 which is provided within the wall of the housing 2. The window 14 is substantially in the form of a slot extending in the longitudinal direction of the housing 2 and having in the circumferential direction of the tubular housing 2 a width that is only slightly greater than the width of the welding groove 15 to be filled with the welding profile 3. The hot air channel 12 is connected with its inlet 12a to the heating device 10 which in the shown embodiment is a hot air source. The hot air channel 12 widens in the flow direction toward the window 14, respectively, toward the welding groove 15 in a funnel-shaped manner so that the hot air exiting the inlet 12a in the flow direction 16 is deflected substantially transverse to the longitudinal housing axis 13. Within the housing insert 11 a guide channel 17 for the welding profile 3 is provided. The inlet section 17a of the channel 17 is delimited between the thermally insulating housing insert 11 and the wall of the housing 2 so that the welding profile at least within the area of the heating device 10 is guided along the wall of the housing 2. The arrangement is such that between the heating device 10 and the inlet section 17a of the guide channel 17 thermally insulating material of the housing insert 11 is positioned. Preferably substantially at the level of the hot air channel 12 the guide channel 17 has an arcuate section 17b extending in the direction toward the hot air channel 12 and opening preferably before or substantially at the level of the longitudinal housing axis 13 into it. The welding profile 3 is guided along the wall 12b of the hot air channel 12 to the window 14 whereby the welding profile is positioned substantially transverse to the flow direction 16 of the hot air entering the hot air channel 12 via the inlet 12a.

On the end face of the housing insert 11 opposite the heating device 10 a pressing device 5 is arranged wherein with the pressure-applying member 4 the preferably flattened lower side 3a of the welding profile 3 is guided into the clamping device 6. The lower end 3a is secured within the clamping device whereby the clamping device 6 is coupled with the pressing device 5 via a linkage 18. The coupling functions such that upon applying the pressure-applying member 4 of the pressing device 5 the clamping device 6 is released so that the flattened lower end 3a of the welding profile 3 is released and can be forced into the groove 15 for welding (fusing).

The welding device serves for welding the welding profile 3 to the inner welding groove 15 of a locking device comprised of hollow profiled members 20, 21 inserted into one another wherein the locking device is part of a multi-sectioned wall that connects wall sections of a multi-sectioned wall functioning as a liquid barrier. The carriage 1 of the inventive welding device is introduced counter to the direction of arrow 19 into the interior of the tubular profiled member 20 whereby the housing 2 is adjusted in its position by support elements 7 provided at the outer circumference. The support elements 7 abut at the inner wall of the inner profiled member 20. The support elements 7 are spring-biased in the radial direction. In a common radial plane of the housing 2 preferably three support elements 7 are equidistantly arranged relative to one another.

Along the longitudinal axis 13 viewed in the direction of arrow 19 a support element 7 is provided in front of the window 14 and a guide element 8, which engages the welding groove 15 and ensures the correct rotational positioning of the carriage 1 within the inner profiled member 20, is located behind the window 14.

The welding groove 15 has been cut in a previously performed working operation with a disk cutter in the direction of the longitudinal housing axis 13 substantially over the entire length of the locking device comprised of the profiled members 20 and 21. The wall of the inner profiled member 20 has been cut through and the groove 15 extends into the wall of the outer profiled member 21. After inserting the carriage 1 to the lower end of the profiled members 20, 21 the heating device 10 is first operated so that the hot air exiting in the direction of arrow 16 partially plasticizes the welding profile 3 toward the end 3a which is clamped within the clamping device 6 whereby the hot air exiting into the welding groove 15 also plasticizes the walls of the groove 15. Subsequently, the pressing device 5 is activated via non-represented control lines whereby due to the coupling of the clamping device 6 and the pressing device 5 the flattened end 3a of the welding profile 3 is released. The flattened end 3a comes to rest at the lower portion of the groove 15 which due to the disk cutter used for cutting the groove 15 is slanted. The end 3a of the welding profile 3 is flattened according to the slant of this portion. The pressure-applying member 4 forces the welding profile 3 into the welding groove 15 so that the partially plasticized material heated to the welding (fusing) temperature of the groove walls and of the welding profile 3 undergo an intimate connection with one another. The carriage 1 is removed in the direction of arrow 19 to the upper end of the locking device whereby the welding profile 3 is forced through the guide channel 17 into the hot air channel 12 and via the pressure-applying member 4 with the required welding pressure into the welding groove 15. The support element 7 which is aligned with the window 14 rests on the inserted welding profile 3 so that a secure position fixation is achieved until the required solidification temperature has been reached.

Since the hot air channel 12, the pressing device 5 with the pressure-applying member 4, and the clamping device 6 are positioned radially inwardly of the common window 14, the arcuate section 17b of the guide channel 17 as well as the pressing device 5 and the clamping device 9 are easily accessible and therefore easy to service.

The wall 12b of the hot air channel 12 opens at the end face of the housing insert 11 before the inner wall of the housing 2 so that a hot air transfer into the area of the pressure-applying member 4 is ensured. It is thus ensured that before the step of introducing the welding profile 3 into the groove 15 a sufficient heating is performed for reaching the required welding temperature of approximately 200° C. to 220° C.

In the embodiment according to FIG. 1 the pressing device 5 is in the form of a pressure cylinder 5a. The adjusting rod 22 of the pressure cylinder 5a acts transverse to the longitudinal housing axis 13 directly onto the pressure-applying member 4. The pressure cylinder 5a may be in the form of a hydraulic or pneumatic pressure cylinder. A connector 18 is directly connected between the adjusting rod 22 and the clamping device 6 in order to provide for the aforementioned coupling of the two devices.

Figure 2:
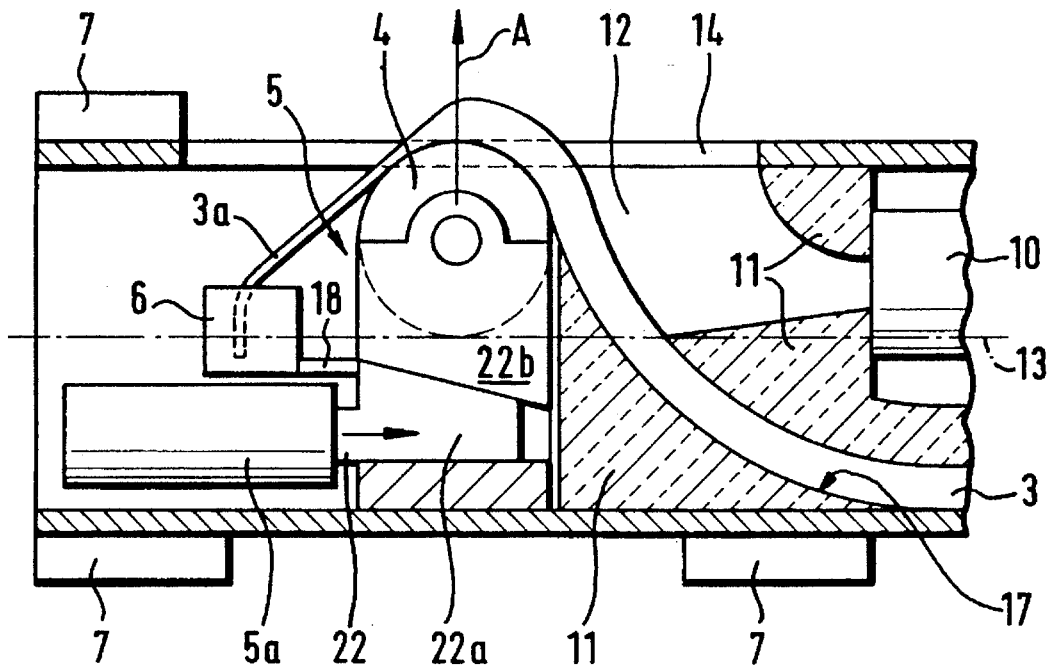
FIG. 2 shows in section the welding head of a further embodiment of the inventive welding device.

In the embodiment according to FIG. 2 the pressure cylinder 5a of the pressing device 5 is aligned in the longitudinal direction of the longitudinal housing axis 13 whereby the adjusting rod 22 is provided with a wedge 22a that cooperates with a carriage 22b. The carriage 22b is slidably guided transverse to the longitudinal housing axis 13 and supports the pressure-applying member 4 which is preferably in the form of a rotatable roller. The connector 18 for releasing the clamping device 6 is coupled to the wedge 22a.

Figure 3:
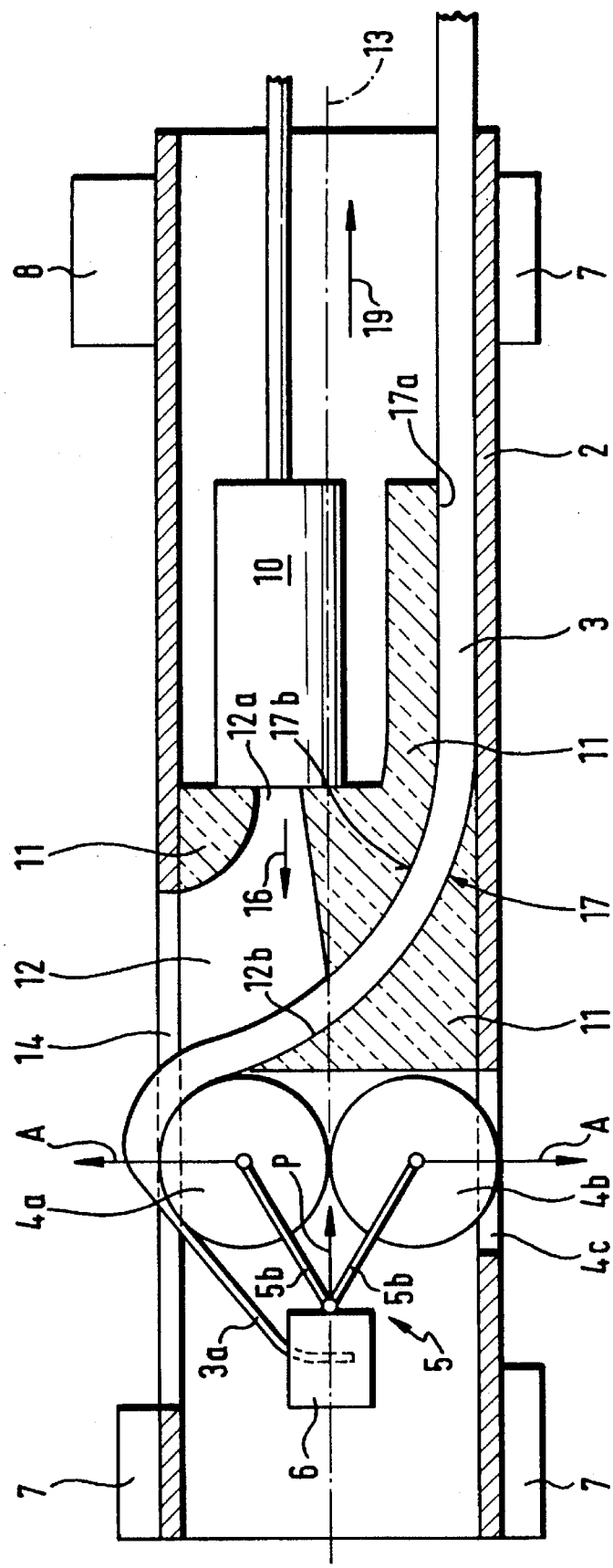
FIG. 3 shows in section a further embodiment of the inventive welding device.

In the embodiment according to FIG. 3 the pressing device 5 is comprised of two rollers 4a and 4b which are connected to one another with a linkage 5b. The rollers 4a and 4b are displaceably supported transverse to the longitudinal housing axis 13 whereby by applying a pulling force in the direction of the longitudinal housing axis 13 (arrow P) the linkage 5b displaces radially the pressure-applying member 4a and the counter pressure member 4b in the direction of arrow A. The pressure-applying member 4a has thus coordinated therewith a counter pressure member 4b. The latter can be brought into contact with the wall of the inner profiled member 20 (FIG. 1) via the housing window 4c of the housing 2. With the linkage 5b the clamping device 6 is coupled so that the release of the clamping device 6 upon pressing the welding profile 3 into the welding groove 15 is ensured. The pulling force acting on the linkage 5b is preferably applied via a pulling cord, a pulling rod, actuated by a pressure cylinder, a spring arrangement etc. Preferably, a pneumatic pressure cylinder is used whereby the pressure, respectively, pulling forces generated can be adjusted or controlled.

Figure 4:
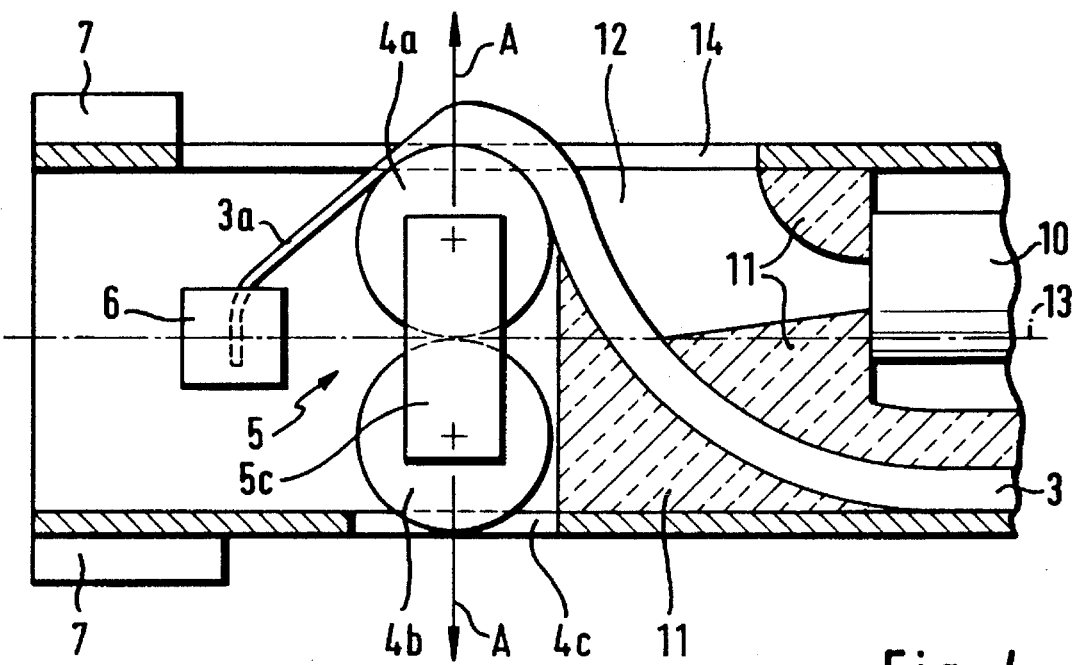
FIG. 4 shows the welding head of another embodiment of the inventive welding device.

The embodiment according to FIG. 4 corresponds substantially in its design to the one of FIG. 3 whereby between the members 4a, 4b in the form of rollers a spreading device 5c is arranged which can be in the form of a prestressed spring. A spreading device 5c ensures the displacement of the members 4a and 4b transverse to the longitudinal housing axis 13 in direction of arrow A. The clamping device 6 is manually released with a non-represented separate release device at the required point in time.

The present invention is, of course, in no way restricted to the specific disclosure of the specification and drawings, but also encompasses any modifications within the scope of the appended claims.

What we claimed is:

1. A welding device for welding a welding profile to an inner welding groove of a locking device comprised of a first hollow profiled member inserted into a second hollow profiled member, said device comprising:

a carriage with a housing, said carriage having a longitudinal axis and being moveable in the longitudinal direction;

a heating device connected inside said housing;

a pressing device, for pressing the welding profile into the welding groove, connected inside said housing, said pressing device comprising a pressure-applying member;

a clamping device, for securing a lower flattened end of the welding profile, connected inside said housing, wherein in a direction of supplying the welding profile said clamping device is arranged downstream of said heating device and said pressing device; and wherein the welding profile is guided from said heating device via said pressure-applying member to said clamping device.

2. A welding device according to claim 1, wherein said clamping device and said pressing device are coupled with one another such that upon applying said pressing device said clamping device is released.

3. A welding device according to claim 1, wherein said heating device is a source of hot air having a hot air channel that opens into the welding groove.

4. A welding device according to claim 3, wherein said hot air channel is funnel-shaped and widens in a direction of hot air flow toward the welding groove.

5. A welding device according to claim 3, wherein said hot air channel has a wall section for guiding the welding profile toward said pressure-applying member.

6. A welding device according to claim 5, wherein the welding profile is guided obliquely to an inflow direction of hot air into said hot air channel.

7. A welding device according to claim 3, wherein said housing comprises an insulating insert and said hot air channel is positioned within said insulating insert.

8. A welding device according to claim 7, wherein said insulating insert has a guide channel for the welding profile, said guide channel opening into said hot air channel.

9. A welding device according to claim 8, wherein said guide channel has an inlet section delimited by said insulating insert and a wall of said housing.

10. A welding device according to claim 3, wherein said housing has a window and wherein said hot air channel and said pressure-applying member are positioned inside said housing behind said window.

11. A welding device according to claim 10, wherein said clamping device is also positioned behind said window.

12. A welding device according to claim 1, further comprising:
   a counter pressure member positioned diametrically opposite said pressure-applying member relative to said longitudinal axis; and
   a housing opening through which said counter pressure member can be moved in and out of contact with said pressure-applying member.

13. A welding device according to claim 12, further comprising a linkage connected to said pressure-applying member and said counter pressure member for displacing together said pressure-applying member and said counter pressure member.

14. A welding device according to claim 13, further comprising a pressure cylinder for actuating said linkage.

15. A welding device according to claim 14, wherein a force applied by said pressure cylinder onto said pressure-applying member is adjustable.

16. A welding device according to claim 12, further comprising spring-biased spreading device connected between said pressure-applying member and said counter pressure member.

17. A welding device according to claim 16, wherein a force applied by said spreading device onto said pressure-applying member is adjustable.

18. A welding device according to claim 12, wherein said counter pressure member is a roller.

19. A welding device according to claim 1, further comprising a pressure cylinder connected to said pressure-applying member for displacing said pressure-applying member.

20. A welding device according to claim 19, further comprising a slide connected between said pressure-applying member and said pressure cylinder, wherein said pressure cylinder acts on said slide to displace said pressure-applying member transverse to said longitudinal axis.

21. A welding device according to claim 20, wherein said slide is wedge-shaped.

22. A welding device according to claim 19, wherein a force applied by said pressure cylinder onto said pressure-applying member is adjustable.

23. A welding device according to claim 1, wherein said pressure-applying member is a roller.

* * * * *